(12) United States Patent
Yamaguchi et al.

(10) Patent No.: US 12,738,967 B2
(45) **Date of Patent: *Sep. 15, 2026**

(54) RADIO-FREQUENCY MODULES THAT ENHANCE NOISE REDUCTION USING BYPASS CAPACITORS IN DOUBLE-SIDED MOUNTING CONFIGURATIONS

(71) Applicant: Murata Manufacturing Co., Ltd., Nagaokakyo (JP)

(72) Inventors: Yukiya Yamaguchi, Nagaokakyo (JP); Hiroki Shounai, Nagaokakyo (JP); Atsushi Horita, Nagaokakyo (JP)

(73) Assignee: MURATA MANUFACTURING CO., LTD., Nagaokakyo (JP)

( * ) Notice: Subject to any disclaimer, the term of this patent is extended or adjusted under 35 U.S.C. 154(b) by 293 days.

This patent is subject to a terminal disclaimer.

(21) Appl. No.: 18/442,117

(22) Filed: Feb. 15, 2024

(65) Prior Publication Data

US 2024/0187029 A1 Jun. 6, 2024

Related U.S. Application Data

(63) Continuation of application No. PCT/JP2022/030292, filed on Aug. 8, 2022.

(30) Foreign Application Priority Data

Aug. 20, 2021 (JP) ................................ 2021-134718

(51) Int. Cl.
*H04B 1/38* (2015.01)
*H04B 1/00* (2006.01)

(52) U.S. Cl.
CPC ............ *H04B 1/38* (2013.01); *H04B 1/0078* (2013.01)

(58) Field of Classification Search
CPC .... H03F 2200/451; H03F 3/245; H03F 3/195; H03F 2200/294; H03F 3/72;
(Continued)

(56) References Cited

U.S. PATENT DOCUMENTS 9,263,186 B2 2/2016 Li et al.
2010/0181101 A1* 7/2010 Han .................... H05K 1/0231 174/255

(Continued)

FOREIGN PATENT DOCUMENTS

JP H08-116024 A 5/1996
JP 2003-101432 A 4/2003

(Continued)

OTHER PUBLICATIONS

International Search Report and Written Opinion mailed on Sep. 27, 2022, received for PCT Application PCT/JP2022/030292, filed on Aug. 8, 2022, 18 pages including English Translation.

*Primary Examiner* — Golam Sorowar
(74) *Attorney, Agent, or Firm* — XSENSUS LLP

(57) ABSTRACT

A radio-frequency module includes a module substrate having major surfaces that are opposite to each other, a plurality of electronic components disposed at the major surface and at the major surface, and a plurality of post electrodes that are disposed at the major surface and that include a power supply terminal. The plurality of electronic components includes an integrated circuit that is disposed at the major surface and that includes a control circuit coupled to the power supply terminal. The plurality of electronic components also include a capacitor that is disposed at the major surface and that is coupled between the path connecting the power supply terminal to the control circuit and ground. The power supply terminal is disposed closer to the capacitor than any other post electrodes; and/or the capacitor is
(Continued)

disposed closer to the power supply terminal than any other electronic component disposed at the major surface.

18 Claims, 4 Drawing Sheets

(58) Field of Classification Search
CPC ....... H03F 2203/7209; H03F 2200/111; H03F 1/56; H03F 2200/222; H03F 1/565; H03F 2200/387; H03F 3/211; H03F 2200/534; H03F 2200/537; H03F 2200/516; H03F 2200/171; H03F 2200/541; H04B 1/38; H04B 1/006; H04B 2001/0408; H04B 1/40; H04B 1/00; H04B 1/04; H04B 1/0458; H04B 1/0057; H04B 1/0078; H04B 1/18; H04B 1/0475; H04B 1/1615; H04B 1/03; H04B 1/44; H04B 1/0483; H10W 90/00; H10W 70/611; H10W 70/685; H10W 42/20; H10W 99/00; H10W 44/20; H10W 90/701; H10W 44/234; H10W 70/60; H10W 74/114; H10W 90/724; H10W 42/276; H10W 70/65; H10W 44/209; H10W 74/00
See application file for complete search history.

(56) References Cited

U.S. PATENT DOCUMENTS

| | | | | |
|---|---|---|---|---|
| 2021/0135695 | A1* | 5/2021 | Uejima | H04B 1/0057 |
| 2021/0152200 | A1* | 5/2021 | Horita | H04B 1/18 |
| 2021/0194518 | A1* | 6/2021 | Ito | H04B 1/1018 |
| 2021/0203372 | A1* | 7/2021 | Yoshida | H04B 1/40 |

FOREIGN PATENT DOCUMENTS

| | | | |
|---|---|---|---|
| JP | 2005-150283 | A | 6/2005 |
| JP | 2007-241802 | A | 9/2007 |
| JP | 2010-273215 | A | 12/2010 |
| JP | 2019-176452 | A | 10/2019 |
| JP | 2020-120159 | A | 8/2020 |

* cited by examiner

RADIO-FREQUENCY MODULES THAT ENHANCE NOISE REDUCTION USING BYPASS CAPACITORS IN DOUBLE-SIDED MOUNTING CONFIGURATIONS

CROSS-REFERENCE TO RELATED APPLICATIONS

This is a continuation application of PCT/JP2022/030292, filed on Aug. 8, 2022, designating the United States of America, which is based on and claims priority to Japanese Patent Application No. JP 2021-134718 filed on Aug. 20, 2021. The entire contents of the above-identified applications, including the specifications, drawings and claims, are incorporated herein by reference in their entirety.

TECHNICAL FIELD

The present disclosure relates to radio-frequency modules.

BACKGROUND ART

In mobile communication devices such as mobile phones, the complexity of radio-frequency front-end modules has increased, particularly due to the development of multiband operation. The package module of Patent Document 1 uses a double-sided mounting board, and a semiconductor integrated circuit and capacitors are disposed on the reverse surface of the double-sided mounting board.

CITATION LIST

Patent Document

Patent Document 1: U.S. Pat. No. 9,263,186 Summary of Disclosure

Technical Problem

Assuming the capacitors are used as bypass capacitors for reducing noise in power supply paths, the known technology cannot achieve noise reduction in some situations.

The present disclosure provides radio-frequency modules that enhance noise reduction using bypass capacitors in double-sided mounting configurations.

Solution to Problem

A radio-frequency module according to an aspect of the present disclosure includes a module substrate having a first major surface and a second major surface that are opposite to each other, a plurality of electronic components disposed at the first major surface and at the second major surface, and a plurality of external connection terminals that are disposed at the second major surface and that include a power supply terminal. The plurality of electronic components includes a first electronic component and a second electronic component. The first electronic component is disposed at the second major surface and includes an active circuit coupled to the power supply terminal. The second electronic component is disposed at the second major surface and includes a capacitor coupled between a path connecting the power supply terminal to the active circuit and ground. The power supply terminal is disposed closer to the second electronic component than any other external connection terminals.

A radio-frequency module according to an aspect of the present disclosure includes a module substrate having a first major surface and a second major surface that are opposite to each other, a plurality of electronic components disposed at the first major surface and at the second major surface, and a plurality of external connection terminals that are disposed at the second major surface and that include a power supply terminal. The plurality of electronic components includes a first electronic component and a second electronic component. The first electronic component is disposed at the second major surface and includes an active circuit coupled to the power supply terminal. The second electronic component is disposed at the second major surface and includes a capacitor coupled between a path connecting the power supply terminal to the active circuit and ground. The second electronic component is disposed closer to the power supply terminal than any other electronic component disposed at the second major surface.

A radio-frequency module according to an aspect of the present disclosure includes a module substrate having a first major surface and a second major surface that are opposite to each other, a plurality of electronic components disposed at the first major surface and at the second major surface, and a plurality of external connection terminals that are disposed at the second major surface and that include a power supply terminal. The plurality of electronic components includes a first electronic component and a second electronic component. The first electronic component is disposed at the second major surface and includes an active circuit coupled to the power supply terminal. The second electronic component is disposed at the second major surface and includes a capacitor coupled between a path connecting the power supply terminal to the active circuit and ground. The second electronic component is disposed between the power supply terminal and the first electronic component in plan view of the module substrate.

Advantageous Effects of Disclosure

The radio-frequency modules according to aspects of the present disclosure enhance noise reduction using the bypass capacitors in double-sided mounting configurations.

DESCRIPTION OF EMBODIMENTS

Figure 1:
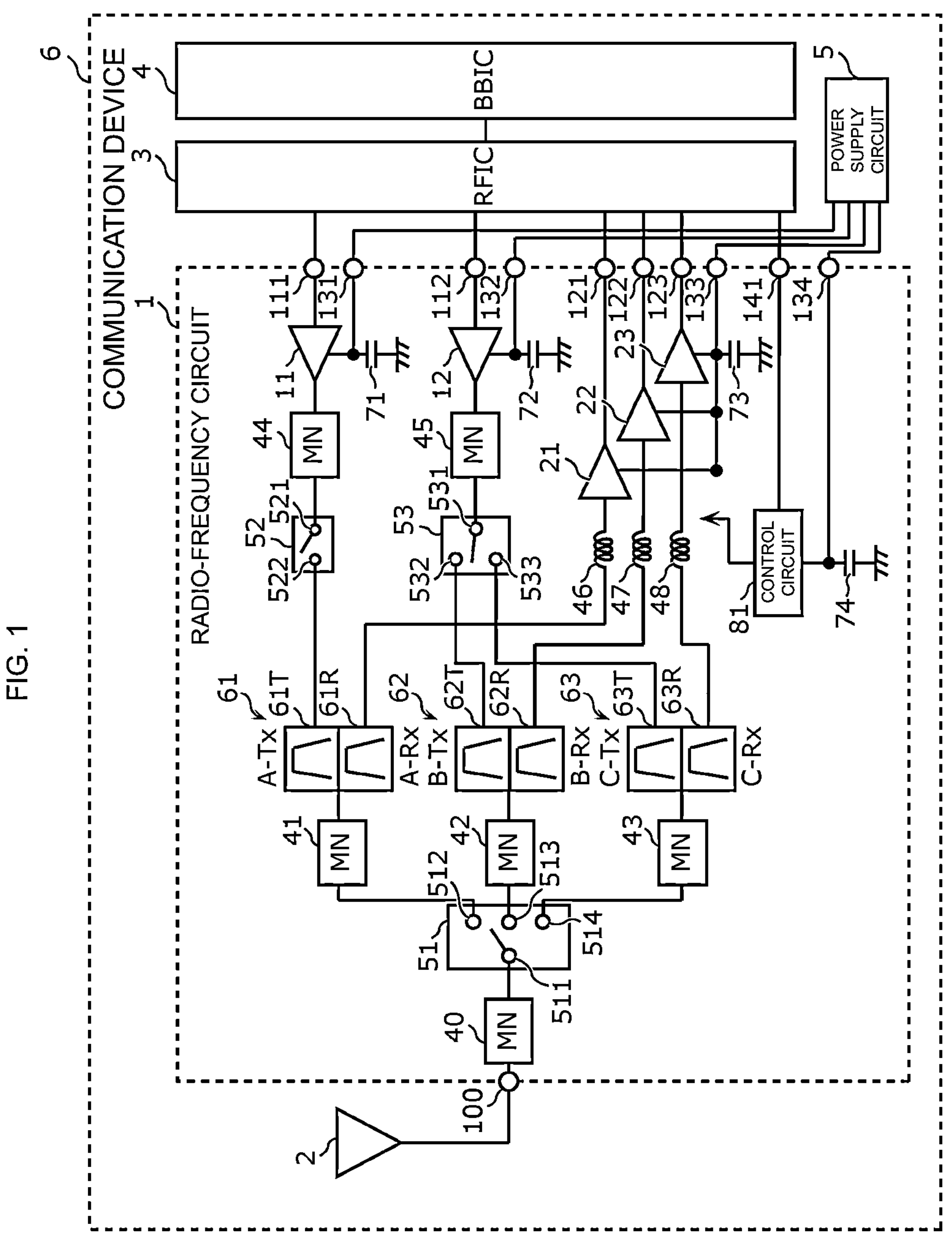
FIG. 1 is a circuit configuration diagram of a radio-frequency circuit and a communication device according to an embodiment.

Hereinafter, an embodiment of the present disclosure will be described in detail with reference to the drawings. The embodiment described below represents a comprehensive or specific example. Details such as numerical values, shapes, materials, constituent elements, and arrangements and connection modes of the constituent elements provided in the following embodiment are illustrative and are not intended to limit the present disclosure.

The drawings are schematically illustrated with necessary emphasis, omissions, or proportion adjustments to depict the present disclosure and do not necessarily represent exact details; thus, the shapes, positional relationships, and proportions can differ from actual implementations. Identical reference numerals are assigned to substantially the same configuration elements across the drawings, and redundant descriptions of these configuration elements can be omitted or simplified.

In the drawings described later, the x-axis and the y-axis are perpendicular to each other in a plane parallel to the major surfaces of a module substrate. Specifically, assuming the module substrate is rectangular in plan view, the x-axis is parallel to a first side of the module substrate, and the y-axis is parallel to a second side perpendicular to the first side of the module substrate. The z-axis is perpendicular to the major surfaces of the module substrate. Along the z-axis, the positive direction indicates upward, and the negative direction indicates downward.

In the circuit configurations of the present disclosure, the term “coupled” applies assuming one circuit element is directly coupled to another circuit element via a connection terminal and/or an interconnect conductor. The term also applies assuming one circuit element is electrically coupled to another circuit element via still another circuit element. The term “coupled between A and B” refers to a situation in which one circuit element is positioned between A and B and coupled to both A and B. The term applies assuming the circuit element is coupled in series in the path connecting A and B and also assuming the circuit element is coupled in parallel (shunt-connected) between the path and ground.

In the component layouts of the present disclosure, the term “plan view of a module substrate” refers to a situation in which an object is orthogonally projected onto an xy-plane, viewed from the positive side of the z-axis. The expression “A is disposed between B and C” refers to a situation in which at least one of the line segments each connecting any given point within B to any given point within C passes through A. Terms describing relationships between elements, such as “parallel” and “vertical”, terms indicating an element’s shape, such as “rectangular”, and numerical ranges are not meant to convey only precise meanings. These terms and numerical ranges denote meanings that are substantially the same, involving, for example, about several percent differences.

In the component layouts of the present disclosure, the expression “a component is disposed at a substrate” applies assuming the component is disposed at a major surface of the substrate and also assuming the component is disposed inside the substrate. The expression “a component is disposed at a major surface of a substrate” applies assuming the component is disposed in contact with the major surface of the substrate and also assuming the component is disposed above the major surface without making contact with the major surface (for example, assuming the component is stacked on another component that is disposed in contact with the major surface). The expression “a component is disposed at a major surface of a substrate” may apply assuming the component is disposed in a depressed portion formed at the major surface. The expression “a component is disposed inside a substrate” applies assuming the component is encapsulated in the module substrate; additionally, the expression applies assuming the component is entirely positioned between the two major surfaces of the substrate but not fully covered by the substrate and also applies assuming only a portion of the component is disposed inside the substrate.

In the present disclosure, the term “electronic component” refers to a component that includes an active element and/or a passive element. This means that electronic components encompass active components such as transistors and diodes, and passive components such as inductors, transformers, capacitors, and resistors. However, electronic components do not encompass electromechanical components such as terminals, connectors, and wires.

Embodiment

1 Circuit Configuration of Radio-Frequency Circuit 1 and Communication Device 6

A circuit configuration of a radio-frequency circuit 1 and a communication device 6 according to the present embodiment will be described with reference to FIG. 1. FIG. 1 is a circuit configuration diagram of the radio-frequency circuit 1 and the communication device 6 according to the present embodiment.

1.1 Circuit Configuration of Communication Device 6

First, a circuit configuration of the communication device 6 will be described. As illustrated in FIG. 1, the communication device 6 according to the present embodiment includes the radio-frequency circuit 1, an antenna 2, a radio-frequency integrated circuit (RFIC) 3, and a baseband integrated circuit (BBIC) 4, and a power supply circuit 5.

The radio-frequency circuit 1 is operable to transfer radio-frequency signals between the antenna 2 and the RFIC 3. An internal configuration of the radio-frequency circuit 1 will be described later.

The antenna 2 is coupled to an antenna connection terminal 100 of the radio-frequency circuit 1. The antenna 2 is operable to transmit a radio-frequency signal outputted from the radio-frequency circuit 1 and to receive a radio-frequency signal from outside and output the radio-frequency signal to the radio-frequency circuit 1.

The RFIC 3 is an example of a signal processing circuit for processing radio-frequency signals. Specifically, the RFIC 3 is operable to process, for example by down-conversion, radio-frequency receive signals inputted through receive paths of the radio-frequency circuit 1 and output the receive signals generated by the signal processing to the BBIC 4. The RFIC 3 is also operable to process, for example by up-conversion, transmit signals inputted from the BBIC 4 and output the radio-frequency transmit signals generated by the signal processing to transmit paths of the radio-frequency circuit 1. The RFIC 3 includes a control unit for controlling elements included in the radio-frequency circuit 1, such as switches and amplifiers. The function of the control unit of the RFIC 3 may be partially or entirely implemented outside the RFIC 3; for example, the function of the control unit of the RFIC 3 may be implemented in the BBIC 4 or the radio-frequency circuit 1.

The BBIC 4 is a baseband signal processing circuit for performing signal processing using an intermediate frequency band that is lower than radio-frequency signals transferred by the radio-frequency circuit 1. Signals such as image signals for image display and/or sound signals for calls through speakers are used as signals to be processed by the BBIC 4.

The power supply circuit 5 is coupled to a power supply (not illustrated in the drawing) and the radio-frequency circuit 1. The power supply circuit 5 is operable to supply power to the radio-frequency circuit 1. The power supply circuit 5 may be included in the radio-frequency circuit 1.

The antenna 2, the BBIC 4, and the power supply circuit 5 are non-essential constituent elements in the communication device 6 according to the present embodiment.

1.2 Circuit Configuration of Radio-Frequency Circuit 1

Next, a circuit configuration of the radio-frequency circuit 1 will be described. As illustrated in FIG. 1, the radio-frequency circuit 1 includes power amplifiers (PA) 11 and 12, low-noise amplifiers (LNA) 21 to 23, matching circuits (MN) 40 to 45, inductors (L) 46 to 48, switches (SW) 51 to 53, duplexers 61 to 63, capacitors (C) 71 to 73, a control circuit 81 (PAC), the antenna connection terminal 100, radio-frequency input terminals 111 and 112, radio-frequency output terminals 121 to 123, the power supply terminals 131 to 134, and a control terminal 141. In the following, the constituent elements of the radio-frequency circuit 1 will be individually described.

The antenna connection terminal 100 is coupled to the antenna 2 outside the radio-frequency circuit 1.

The radio-frequency input terminals 111 and 112 are terminals for receiving radio-frequency transmit signals from outside the radio-frequency circuit 1. In the present embodiment, the radio-frequency input terminals 111 and 112 are coupled to the RFIC 3 outside the radio-frequency circuit 1.

The radio-frequency output terminals 121 to 123 are terminals for supplying radio-frequency receive signals to outside the radio-frequency circuit 1. In the present embodiment, the radio-frequency output terminals 121 to 123 are coupled to the RFIC 3 outside the radio-frequency circuit 1.

Each of the power supply terminals 131 to 134 is an example of an external connection terminal for power supply. Each of the power supply terminals 131 to 134 is a terminal for receiving power supplied from outside. In the present embodiment, the power supply terminals 131 to 134 are coupled to the power supply circuit 5 outside the radio-frequency circuit 1. The power supply terminals 131 to 134 are also coupled to the power amplifiers 11 and 12, the low-noise amplifiers 21 to 23, and the control circuit 81 inside the radio-frequency circuit 1.

The control terminal 141 is a terminal for transferring control signals. Specifically, the control terminal 141 functions as a terminal for receiving control signals from outside the radio-frequency circuit 1 and/or a terminal for supplying control signals to outside the radio-frequency circuit 1. The control signal relates to controls on electronic circuits included in the radio-frequency circuit 1. Specifically, the control signal is a digital signal for controlling, for example, at least one of the power amplifiers 11 and 12, the low-noise amplifiers 21 to 23, and the switches 51 to 53.

The power amplifier 11 is an active circuit. The power amplifier 11 is coupled between the radio-frequency input terminal 111 and a transmit filter 61T. The power amplifier 11 is operable to amplify transmit signals in a band A using a supply voltage that is supplied through the power supply terminal 131. Specifically, an input end of the power amplifier 11 is coupled to the radio-frequency input terminal 111. An output end of the power amplifier 11 is able to be coupled to the transmit filter 61T via the matching circuit 44 and the switch 52.

The power amplifier 12 is an active circuit. The power amplifier 12 is coupled between the radio-frequency input terminal 112 and transmit filters 62T and 63T. The power amplifier 12 is operable to amplify transmit signals in bands B and C using a supply voltage that is supplied through the power supply terminal 132. Specifically, an input end of the power amplifier 12 is coupled to the radio-frequency input terminal 112. An output end of the power amplifier 12 is able to be coupled to the transmit filters 62T and 63T via the matching circuit 45 and the switch 53.

The power amplifiers 11 and 12 are active components for obtaining output signals with higher energy than input signals (transmit signals), using power supplied from the power supply. Each of the power amplifiers 11 and 12 includes an amplifier transistor. Each of the power amplifiers 11 and 12 may additionally include an inductor and/or a capacitor. The internal configuration of the power amplifiers 11 and 12 is not limited to a specific configuration. The power amplifiers 11 and 12 may be, for example, multistage amplifiers, differential amplifiers, or Doherty amplifiers.

The low-noise amplifier 21 is an active circuit. The low-noise amplifier 21 is coupled between a receive filter 61R and the radio-frequency output terminal 121. The low-noise amplifier 21 is operable to amplify receive signals in the band A using a supply voltage that is supplied through the power supply terminal 133. Specifically, an input end of the low-noise amplifier 21 is coupled to the receive filter 61R via the inductor 46. An output end of the low-noise amplifier 21 is coupled to the radio-frequency output terminal 121.

The low-noise amplifier 22 is an active circuit. The low-noise amplifier 22 is coupled between a receive filter 62R and the radio-frequency output terminal 122. The low-noise amplifier 22 is operable to amplify receive signals in the band B using a supply voltage that is supplied through the power supply terminal 133. Specifically, an input end of the low-noise amplifier 22 is coupled to the receive filter 62R via the inductor 47. An output end of the low-noise amplifier 22 is coupled to the radio-frequency output terminal 122.

The low-noise amplifier 23 is an active circuit. The low-noise amplifier 23 is coupled between a receive filter 63R and the radio-frequency output terminal 123. The low-noise amplifier 23 is operable to amplify receive signals in the band C using a supply voltage that is supplied through the power supply terminal 133. Specifically, an input end of the low-noise amplifier 23 is coupled to the receive filter 63R via the inductor 48. An output end of the low-noise amplifier 23 is coupled to the radio-frequency output terminal 123.

The low-noise amplifiers 21 to 23 are active components for obtaining output signals with higher energy than input signals (receive signals), using power supplied from the power supply. Each of the low-noise amplifiers 21 to 23 includes an amplifier transistor. Each of the low-noise amplifiers 21 to 23 may additionally include an inductor and/or a capacitor. The internal configuration of the low-noise amplifiers 21 to 23 is not limited to a specific configuration.

The matching circuits 40 to 45 are passive circuits. Each of the matching circuits 40 to 45 is coupled between two circuit elements and operable to provide impedance matching between the two circuit elements. This means that the matching circuits 40 to 45 are impedance matching circuits.

Each of the matching circuits 40 to 45 may include an inductor and/or a capacitor. Each of the matching circuits 40 to 45 may include a transformer.

The inductor 46 is coupled between the receive filter 61R and the low-noise amplifier 21. The inductor 46 is operable to provide impedance matching between the receive filter 61R and the low-noise amplifier 21. The inductor 47 is coupled between the receive filter 62R and the low-noise amplifier 22. The inductor 47 is operable to provide impedance matching between the receive filter 62R and the low-noise amplifier 22. The inductor 48 is coupled between the receive filter 63R and the low-noise amplifier 23. The inductor 48 is operable to provide impedance matching between the receive filter 63R and the low-noise amplifier 23.

The switch 51 is an active circuit. The switch 51 is coupled between the antenna connection terminal 100 and the duplexers 61 to 63. The switch 51 has terminals 511 to 514. The terminal 511 is coupled to the antenna connection terminal 100 via the matching circuit 40. The terminal 512 is coupled to the duplexer 61 via the matching circuit 41. The terminal 513 is coupled to the duplexer 62 via the matching circuit 42. The terminal 514 is coupled to the duplexer 63 via the matching circuit 43.

With this connection configuration, the switch 51 is operable to connect the terminal 511 to at least one of the terminals 512 to 514 in response to, for example, a control signal from the RFIC 3. In other words, the switch 51 is operable to control connection and disconnection between the antenna connection terminal 100 and each of the duplexers 61 to 63. The switch 51 is implemented by, for example, a multi-connection switching circuit.

The switch 52 is an active circuit. The switch 52 is coupled between the power amplifier 11 and the transmit filter 61T. The switch 52 has terminals 521 and 522. The terminal 521 is coupled to the output end of the power amplifier 11 via the matching circuit 44. The terminal 522 is coupled to the transmit filter 61T.

With this connection configuration, the switch 52 is operable to control connection and disconnection between the terminals 521 and 522 in response to, for example, a control signal from the RFIC 3. In other words, the switch 52 is operable to control connection and disconnection between the power amplifier 11 and the transmit filter 61T. The switch 52 is implemented by, for example, a single-pole single-throw (SPST) switching circuit.

The switch 53 is an active circuit. The switch 53 is coupled between the power amplifier 12 and the transmit filters 62T and 63T. The switch 53 has terminals 531 to 533. The terminal 531 is coupled to the output end of the power amplifier 12 via the matching circuit 45. The terminal 532 is coupled to the transmit filter 62T. The terminal 533 is coupled to the transmit filter 63T.

With this connection configuration, the switch 53 is operable to connect the terminal 531 to the terminal 532 or 533 in response to, for example, a control signal from the RFIC 3. In other words, the switch 53 is operable to switch the connection of the power amplifier 12 between the transmit filters 62T and 63T. The switch 53 is implemented by, for example, a single-pole double-throw (SPDT) switching circuit.

The duplexer 61 is a passive circuit. The duplexer 61 is operable to pass transmit signals and receive signals in the band A for frequency division duplex (FDD) and to attenuate signals in other bands. The duplexer 61 includes the transmit filter 61T and the receive filter 61R.

The transmit filter 61T has a pass band that includes an uplink operating band of the band A. The transmit filter 61T is operable to pass transmit signals in the band A. One end of the transmit filter 61T is able to be coupled to the antenna connection terminal 100 via the matching circuit 41, the switch 51, and the matching circuit 40. The other end of the transmit filter 61T is able to be coupled to the output end of the power amplifier 11 via the switch 52.

The receive filter 61R has a pass band that includes a downlink operating band of the band A. The receive filter 61R is operable to pass receive signals in the band A. One end of the receive filter 61R is able to be coupled to the antenna connection terminal 100 via the matching circuit 41, the switch 51, and the matching circuit 40. The other end of the receive filter 61R is coupled to the input end of the low-noise amplifier 21 via the inductor 46.

The duplexer 62 is a passive circuit. The duplexer 62 is operable to pass transmit signals and receive signals in the band B for FDD and to attenuate signals in other bands. The duplexer 62 includes the transmit filter 62T and the receive filter 62R.

The transmit filter 62T has a pass band that includes an uplink operating band of the band B. The transmit filter 62T is operable to pass transmit signals in the band B. One end of the transmit filter 62T is able to be coupled to the antenna connection terminal 100 via the matching circuit 42, the switch 51, and the matching circuit 40. The other end of the transmit filter 62T is able to be coupled to the output end of the power amplifier 12 via the switch 53.

The receive filter 62R has a pass band that includes a downlink operating band of the band B. The receive filter 62R is operable to pass receive signals in the band B. One end of the receive filter 62R is able to be coupled to the antenna connection terminal 100 via the matching circuit 42, the switch 51, and the matching circuit 40. The other end of the receive filter 62R is coupled to the input end of the low-noise amplifier 22 via the inductor 47.

The duplexer 63 is a passive circuit. The duplexer 63 is operable to pass transmit signals and receive signals in the band C for FDD and to attenuate signals in other bands. The duplexer 63 includes the transmit filter 63T and the receive filter 63R.

The transmit filter 63T has a pass band that includes an uplink operating band of the band C. The transmit filter 63T is operable to pass transmit signals in the band C. One end of the transmit filter 63T is able to be coupled to the antenna connection terminal 100 via the matching circuit 43, the switch 51, and the matching circuit 40. The other end of the transmit filter 63T is able to be coupled to the output end of the power amplifier 12 via the switch 53.

The receive filter 63R has a pass band that includes a downlink operating band of the band C. The receive filter 63R is operable to pass receive signals in the band C. One end of the receive filter 63R is able to be coupled to the antenna connection terminal 100 via the matching circuit 43, the switch 51, and the matching circuit 40. The other end of the receive filter 63R is coupled to the input end of the low-noise amplifier 23 via the inductor 48.

The bands A to C are frequency bands for communication systems built using a radio access technology (RAT). The bands A to C are defined by standardization organizations such as the 3rd Generation Partnership Project (3GPP) (registered trademark) and the Institute of Electrical and Electronics Engineers (IEEE). Examples of the communication systems include 5th Generation New Radio (5GNR) systems, Long Term Evolution (LTE) systems, and wireless local area network (WLAN) systems.

The bands A, B, and C may belong to different band groups or the same band group. As used herein, a band group refers to a frequency range that encompasses multiple bands. For example, an ultra high-band group (3300-5000 MHZ), a high-band group (2300-2690 MHZ), a mid-band group (1427-2200 MHz), and a low-band group (698-960 MHZ) can be used as band groups. However, these are not to be interpreted as limiting. For example, a band group that includes unlicensed bands of 5 gigahertz or higher or a band group composed of millimeter-wave bands may be used as a band group.

For example, the band A may belong to the high-band group, and the bands B and C may belong to the mid-band group. Alternatively, for example, the band A may belong to the mid-band group or the high-band group, and the bands B and C may belong to the low-band group.

The capacitors 71 to 74 are referred to as bypass capacitors or decoupling capacitors. The capacitors 71 to 74 are operable to mitigate the impact of noise in power supply paths on the radio-frequency circuit. Specifically, the capacitor 71 is coupled between the path connecting the power supply terminal 131 to the power amplifier 11 and ground. The capacitor 72 is coupled between the path connecting the power supply terminal 132 to the power amplifier 12 and ground. The capacitor 73 is coupled between the path connecting the power supply terminal 133 to the low-noise amplifiers 21 to 23 and ground. The capacitor 74 is coupled between the path connecting the power supply terminal 134 to the control circuit 81 and ground.

The control circuit 81 is an active circuit. The control circuit 81 is operable to control, for example, the power amplifiers 11 and 12. The control circuit 81 is operable to receive digital control signals from the RFIC 3 through the control terminal 141 and output control signals to, for example, the power amplifiers 11 and 12.

The radio-frequency circuit 1 depicted in FIG. 1 is illustrative, and this is not to be interpreted as limiting. For example, the bands that the radio-frequency circuit 1 supports are not limited to the bands A to C. For example, the radio-frequency circuit 1 may support four or more bands. In this case, the radio-frequency circuit 1 may include filters for bands D, E, F, and beyond. For example, the radio-frequency circuit 1 may support only the bands B and C, and not support the band A. In this case, the radio-frequency circuit 1 does not necessarily include the power amplifier 11, the low-noise amplifier 21, the matching circuits 41 and 44, the inductor 46, the switch 52, the duplexer 61, the radio-frequency input terminal 111, and the radio-frequency output terminal 121. For example, the radio-frequency circuit 1 may be a dedicated transmit circuit. In this case, the radio-frequency circuit 1 does not necessarily include the low-noise amplifiers 21 to 23, the inductors 46 to 48, the receive filters 61R to 63R, the radio-frequency output terminals 121 to 123, and the power supply terminal 133. For example, the radio-frequency circuit 1 may be a dedicated receive circuit. In this case, the radio-frequency circuit 1 does not necessarily include the power amplifiers 11 and 12, the matching circuits 44 and 45, the switches 52 and 53, the transmit filters 61T to 63T, the radio-frequency input terminals 111 and 112, and the power supply terminals 131 and 132.

2 Practical Examples of Radio-Frequency Circuit 1

2.1 First Practical Example

As a first practical example of the radio-frequency circuit 1 according to the embodiment described above, a radio-frequency module 1A including the radio-frequency circuit 1 will be described with reference to FIGS. 2 to 5. In this practical example, an integrated circuit 20 that includes the low-noise amplifiers 21 to 23 and an integrated circuit 80 that includes the control circuit 81 individually correspond to a first electronic component; an electronic component that includes the capacitor 73 and an electronic component that includes the capacitor 74 individually correspond to a second electronic component; and an electronic component that includes the inductor 46 and an electronic component that includes the transmit filter 63T individually correspond to a third electronic component.

2.1.1 Component Layout of Radio-Frequency Module 1A

Figure 2:
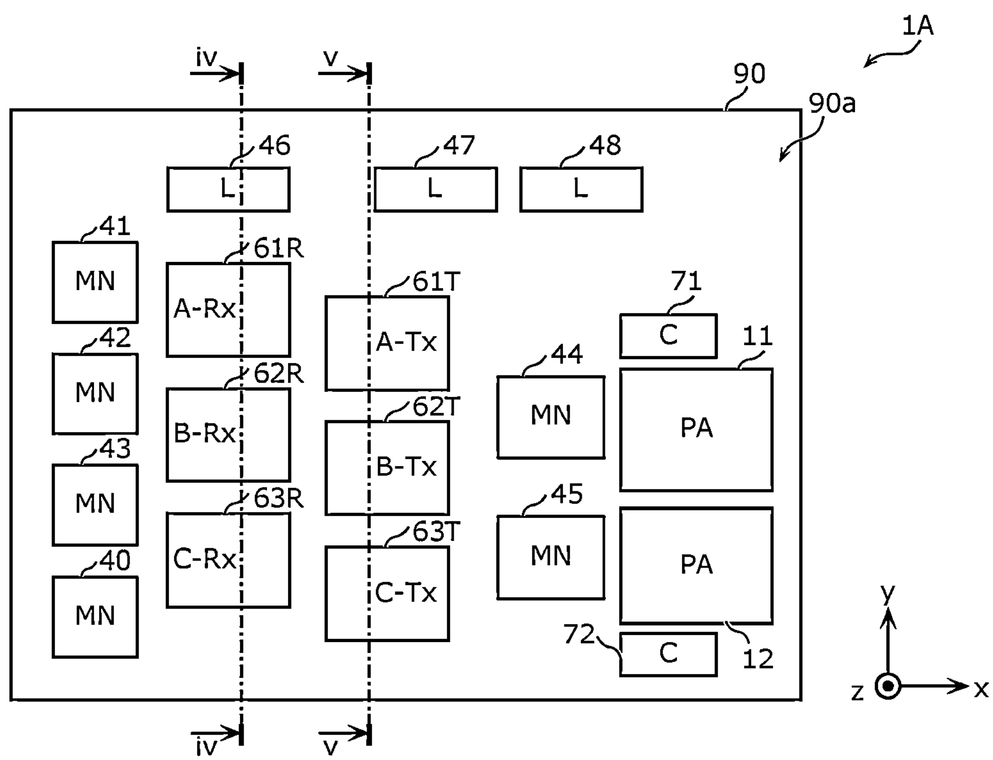
FIG. 2 is a plan view of a radio-frequency module according to a first practical example.
Figure 3:
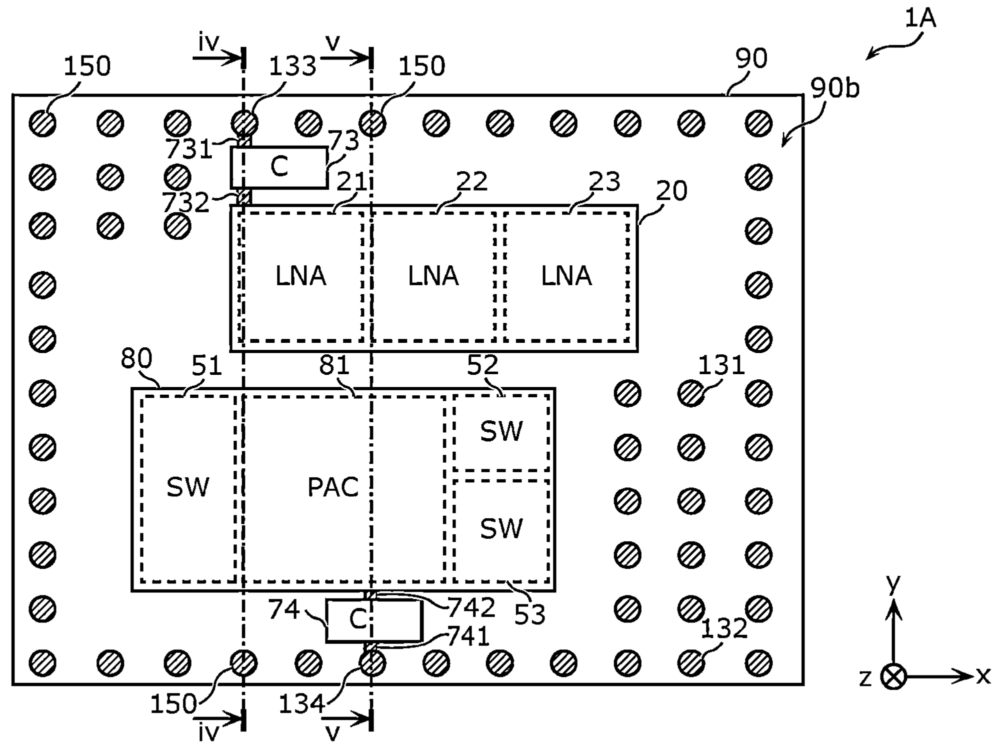
FIG. 3 is a plan view of the radio-frequency module according to the first practical example.
Figure 4:
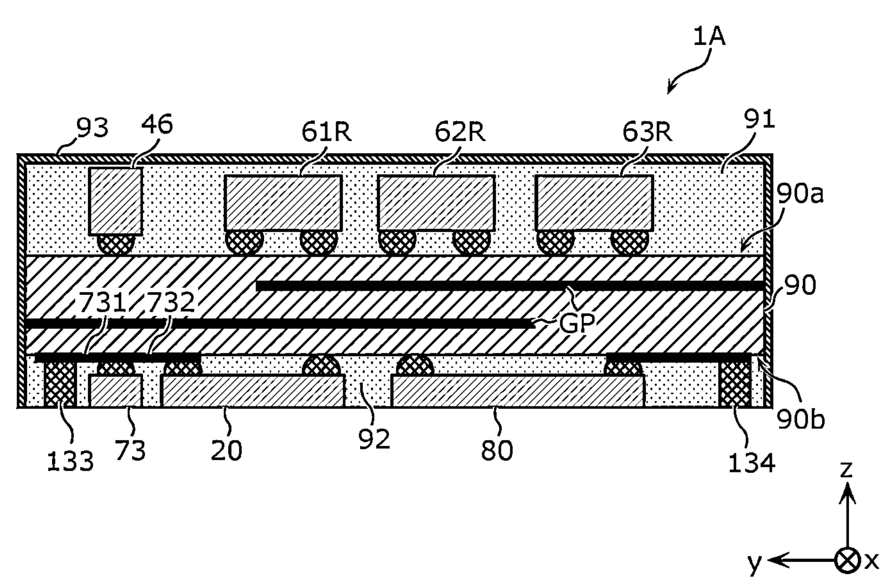
FIG. 4 is a sectional view of the radio-frequency module according to the first practical example.
Figure 5:
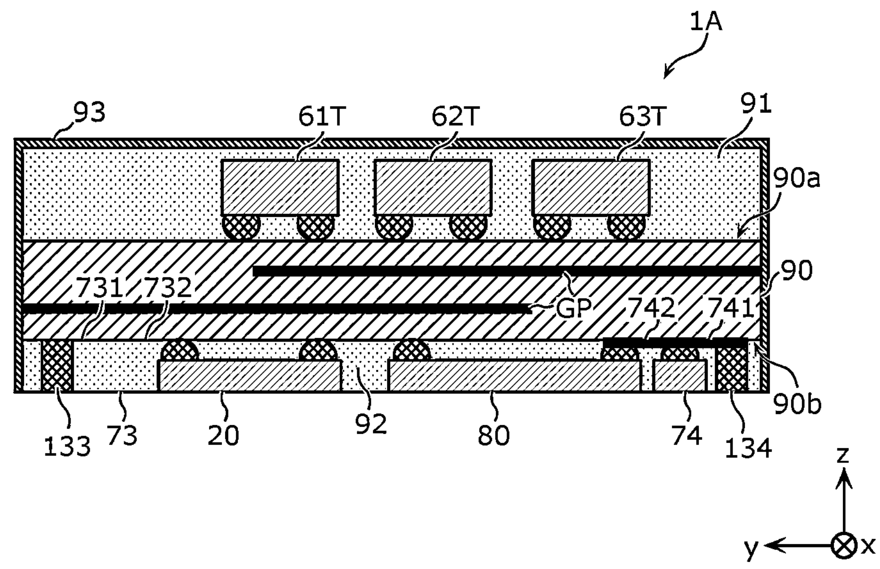
FIG. 5 is a sectional view of the radio-frequency module according to the first practical example.

FIG. 2 is a plan view of the radio-frequency module 1A according to the present practical example. FIG. 3 is a plan view of the radio-frequency module 1A according to the present practical example assuming a major surface 90*b* of a module substrate 90 is viewed through the module substrate 90 from the positive side of the z-axis. FIGS. 4 and 5 are sectional views of the radio-frequency module 1A according to the present practical example. The section plane of the radio-frequency module 1A in FIG. 4 is taken along line iv-iv in FIGS. 2 and 3. The section plane of the radio-frequency module 1A in FIG. 5 is taken along line v-v in FIGS. 2 and 3.

In FIGS. 2 and 3, to simplify understanding of the positional relationships of the components, each component is sometimes labeled with letters representing the component. However, these letters are not marked on the actual components. In FIGS. 2 to 5, the wires connecting components disposed at the module substrate 90 are not fully illustrated. In FIGS. 2 and 3, resin members 91 and 92 covering the components and a shield electrode layer 93 covering the surfaces of the resin members 91 and 92 are not illustrated.

In addition to the electronic components including the active and passive elements incorporated in the radio-frequency circuit 1 illustrated in FIG. 1, the radio-frequency module 1A includes the module substrate 90, the resin members 91 and 92, the shield electrode layer 93, and multiple post electrodes 150.

The module substrate 90 has major surfaces 90*a* and 90*b* that are opposite to each other. The major surface 90*a* is an example of a first major surface, and the major surface 90*b* is an example of a second major surface. Ground electrode layers GP are formed inside the module substrate 90. In FIGS. 2 and 3, the module substrate 90 has a rectangular shape in plan view. However, the module substrate 90 is not limited to this shape.

As the module substrate 90, for example, a low temperature co-fired ceramics (LTCC) substrate or high temperature co-fired ceramics (HTCC) substrate that has a layered structure composed of multiple dielectric layers, a component-embedded substrate, a substrate including a redistribution layer (RDL), or a printed-circuit board can be used. However, these are not to be interpreted as limiting.

At the major surface 90*a*, the power amplifiers 11 and 12, the matching circuits 40 to 45, the inductors 46 to 48, the transmit filters 61T to 63T, the receive filters 61R to 63R, the capacitors 71 and 72, and the resin member 91 are disposed.

Two electronic components that respectively include the power amplifiers 11 and 12 may be constructed using, for example, complementary metal oxide semiconductor (CMOS). Specifically, the two electronic components that respectively include the power amplifiers 11 and 12 may be produced through a silicon on insulator (SOI) process. In this manner, the power amplifiers 11 and 12 can be produced with low costs. The two electronic components that respectively include the power amplifiers 11 and 12 may be made of at least one of gallium arsenide (GaAs), silicon germanium (SiGe), and gallium nitride (GaN). With this configuration, the power amplifiers 11 and 12 can be implemented with high quality.

Each of the matching circuits 40 to 43 is implemented by a chip inductor and/or a chip capacitor. A chip inductor is a surface mount device (SMD) that forms an inductor. A chip capacitor is an SMD that forms a capacitor.

Each of the matching circuits 44 and 45 is implemented by a transformer. The coils that constitute the transformers may be partially or entirely disposed inside the module substrate 90.

Each of the inductors 46 to 48 is implemented by a chip inductor. The inductors 46 to 48 overlap the integrated circuit 20 that includes the low-noise amplifiers 21 to 23 in plan view. The inductors 46 to 48 are not limited to chip inductors. For example, the inductors 46 to 48 may be implemented by integrated passive devices (IPDs).

Each of the capacitors 71 and 72 is implemented by a chip capacitor. The capacitors 71 and 72 are respectively disposed adjacent to the power amplifiers 11 and 12. This configuration shortens the wire between the capacitor 71 as a bypass capacitor and the power amplifier 11 and the wire between the capacitor 72 as a bypass capacitor and the power amplifier 12. Shortening the wires helps to suppress the degradation of the characteristics of the bypass capacitors that can occur due to wire impedances.

The capacitors 71 and 72 are not limited to chip capacitors. For example, the capacitor 71 may be integrated in the same electronic component as the power amplifier 11, and the capacitor 72 may be integrated in the same electronic component as the power amplifier 12. For example, the capacitor 71 and/or the capacitor 72 may be implemented by IPDs.

The transmit filters 61T to 63T and the receive filters 61R to 63R may be implemented by, for example, surface acoustic wave (SAW) filters, bulk acoustic wave (BAW) filters, LC resonance filters, or dielectric filters. However, these are not to be interpreted as limiting.

The resin member 91 at least partially covers the major surface 90*a* and the electronic components disposed at the major surface 90*a*. The resin member 91 functions to secure the reliability of mechanical strength, moisture resistance, and other properties of the electronic components disposed at the major surface 90*a*. The resin member 91, however, is not necessarily included in the radio-frequency module 1A.

At the major surface 90*b*, the integrated circuit 20 that includes the low-noise amplifiers 21 to 23, the integrated circuit 80 that includes the switches 52 and 53 and the control circuit 81, the switch 51, the capacitors 73 and 74, the resin member 92, and the post electrodes 150 are disposed.

Each of the integrated circuits 20 and 80 is an example of a first electronic component. The electronic component (hereinafter simply referred to as the switch 51) that includes the switch 51 is an example of a third electronic component. The integrated circuits 20 and 80 and the switch 51 may be constructed using, for example, CMOS. Specifically, the integrated circuits 20 and 80 and the switch 51 may be produced through an SOI process. The integrated circuits 20 and 80 and the switch 51 are not limited to CMOS components.

Each of the two electronic components (hereinafter simply referred to as the capacitors 73 and 74) that respectively include the capacitors 73 and 74 is an example of a second electronic component and is a semiconductor component. In the present practical example, the capacitors 73 and 74 are silicon capacitors that are constructed using silicon substrates (silicon wafers) through a semiconductor process. The capacitors 73 and 74 are not limited to silicon capacitors and are not necessarily semiconductor components. The capacitors 73 and 74 may be included in IPDs using silicon substrates. Multilayer ceramic capacitors consisting of ceramic materials and conductive pattern electrodes may be used as the capacitors 73 and 74.

The capacitor 73 is disposed between the integrated circuit 20 and a post electrode 150 that serves as the power supply terminal 133 in plan view of the module substrate 90. The capacitor 73 is coupled to the power supply terminal 133 via a wire 731, and to the integrated circuit 20 via a wire 732.

At least a portion of the capacitor 73 overlaps at least a portion of the inductor 46 in plan view of the module substrate 90. At least a portion of the capacitor 73 overlaps at least a portion of the ground electrode layers GP in plan view of the module substrate 90.

The capacitor 73 is disposed adjacent to the power supply terminal 133. Specifically, (a) the power supply terminal 133 is disposed closer to the capacitor 73 than any of the other post electrodes 150; and (b) the capacitor 73 is disposed closer to the power supply terminal 133 than any of the other electronic components (in this example, the integrated circuits 20 and 80 and the capacitor 74) disposed at the major surface 90*b*. In other words, the distance between the capacitor 73 and the power supply terminal 133 is (a) less than or equal to the distance between the capacitor 73 and each of the other post electrodes 150 and (b) less than or equal to the distance between the power supply terminal 133 and each of the other electronic components. It is more effective assuming the distance between the capacitor 73 and the power supply terminal 133 is less than or equal to the thickness of the module substrate 90 (that is, the distance between the major surfaces 90*a* and 90*b*).

As used herein, the distance between two components refers to the length of the shortest line segment among the line segments that connect any given point on one component to any given point on the other component. This means that the distance between two components is the minimum distance.

The capacitor 74 is disposed between the integrated circuit 80 and a post electrode 150 that serves as the power supply terminal 134 in plan view of the module substrate 90. The capacitor 74 is coupled to the power supply terminal 134 via a wire 741, and to the integrated circuit 80 via a wire 742.

At least a portion of the capacitor 74 overlaps at least a portion of the transmit filter 63T in plan view of the module substrate 90. At least a portion of the capacitor 74 overlaps at least a portion of the ground electrode layers GP in plan view of the module substrate 90.

The capacitor 74 is disposed adjacent to the power supply terminal 134. Specifically, (c) the power supply terminal 134 is disposed closer to the capacitor 74 than any of the other post electrodes 150; and (d) the capacitor 74 is disposed closer to the power supply terminal 134 than any of the other electronic components (in this example, the integrated circuits 20 and 80 and the capacitor 73) disposed at the major surface 90*b*. In other words, the distance between the capacitor 74 and the power supply terminal 134 is (c) less than or equal to the distance between the capacitor 74 and each of the other post electrodes 150 and (d) less than or equal to the distance between the power supply terminal 134 and each of the other electronic components. It is more effective assuming the distance between the capacitor 74 and the power supply terminal 134 is less than or equal to the thickness of the module substrate 90.

The post electrodes 150 are an example of a plurality of external connection terminals. The post electrodes 150 include the antenna connection terminal 100, the radio-frequency input terminals 111 and 112, the radio-frequency output terminals 121 to 123, the power supply terminals 131 to 134, and the control terminal 141 illustrated in FIG. 1, as well as a ground terminal. Copper electrodes can be used as the post electrodes 150. However, this is not to be interpreted as limiting. For example, solder electrodes may be used as the post electrodes.

The resin member 92 at least partially covers the major surface 90*b* and the electronic components disposed at the major surface 90*b*. The resin member 92 functions to secure the reliability of mechanical strength, moisture resistance, and other properties of the electronic components disposed at the major surface 90*b*. The resin member 92, however, is not necessarily included in the radio-frequency module 1A.

The shield electrode layer 93 is, for example, a thin metal film that is formed using a sputtering method. The shield electrode layer 93 covers the upper surface of the resin member 91 and the side surfaces of the resin members 91 and 92 and the module substrate 90. The shield electrode layer 93 is grounded to inhibit external noise from interfering with the electronic components constituting the radio-frequency module 1A. The shield electrode layer 93, however, is not necessarily included in the radio-frequency module 1A.

The layout of the electronic components in the present practical example is illustrative, and the present practical example is not to be interpreted as limiting. For example, although in the present practical example, the layout of the capacitor 73 and the power supply terminal 133 satisfies both (a) and (b) described above, this is not to be interpreted as limiting. For example, only one of (a) and (b) may be satisfied. Similarly, although the layout of the capacitor 74 and the power supply terminal 134 satisfies both (c) and (d) described above, this is not to be interpreted as limiting. For example, only one of (c) and (d) may be satisfied.

2.1.2 Effects of Radio-Frequency Module 1A

As described above, the radio-frequency module 1A according to the present practical example includes the module substrate 90 having the major surfaces 90*a* and 90*b* that are opposite to each other, a plurality of electronic components disposed at the major surface 90*a* and at the major surface 90*b*, and the post electrodes 150 that are disposed at the major surface 90*b* and that include the power supply terminal 133 or 134. The plurality of electronic components includes a first electronic component (for example, the integrated circuit 20 or 80) that is disposed at the major surface 90*b* and that includes an active circuit (for example, the low-noise amplifiers 21 to 23 or the control circuit 81) coupled to the power supply terminal 133 or 134 and a second electronic component that is disposed at the major surface 90*b* and that includes the capacitor 73 or 74 coupled between the path connecting the power supply terminal 133 or 134 to the active circuit and ground. The power supply terminal 133 or 134 is disposed closer to the second electronic component than any of the other post electrodes; and/or the second electronic component is disposed closer to the power supply terminal 133 or 134 than any other electronic component disposed at the major surface 90*b*.

As described above, the second electronic component including the capacitor 73 or 74, which is coupled between the path connecting the power supply terminal to the active circuit and ground, is disposed close to the power supply terminal 133 or 134 at the same major surface 90*b*. Positioning the second electronic component in this manner shortens the wire 731 or 741 that connects the bypass capacitor (the capacitor 73 or 74) to the power supply terminal 133 or 134, thereby mitigating interference from noise on the wire 731 or 741. As a result, this configuration enhances noise reduction.

In an example, in the radio-frequency module 1A according to the present practical example, the second electronic component is disposed between the first electronic component and the power supply terminal 133 or 134 in plan view of the module substrate 90.

Positioning the second electronic component in this manner shortens the wire 731 or 734 that connects the power supply terminal 133 or 134 to the bypass capacitor (the capacitor 73 or 74) and the wire 732 or 742 that connects the integrated circuit 20 or 80 to the bypass capacitor. This configuration thus mitigates interference from noise on the wire 731 or 741. Further, shortening the wire 732 or 742 reduces the impedance of the wire 732 or 742. This configuration thus suppresses degradation of the characteristics of the bypass capacitor that can occur due to the impedance of the wire 732 or 742.

In an example, in the radio-frequency module 1A according to the present practical example, the active circuit included in the first electronic component may be the low-noise amplifiers 21 to 23.

This configuration enhances noise reduction on the low-noise amplifiers 21 to 23.

In an example, in the radio-frequency module 1A according to the present practical example, the plurality of electronic components may further include a third electronic component that is disposed at the major surface 90*a* and that includes the inductor 46 coupled to the input end of the low-noise amplifier 21; and at least a portion of the second electronic component may overlap at least a portion of the third electronic component in plan view of the module substrate 90.

Since the second electronic component including the inductor 46 coupled to the low-noise amplifier 21 is disposed close to the first electronic component including the low-noise amplifier 21, the wire that connects the inductor 46 to the low-noise amplifier 21 can be shortened. This configuration thus reduces the mismatch loss that can occur due to the stray capacitance of the wire.

In an example, in the radio-frequency module 1A according to the present practical example, the active circuit included in the first electronic component may be the control circuit 81 configured to control the power amplifiers 11 and 12.

This configuration enhances noise reduction on the control circuit 81.

In an example, in the radio-frequency module 1A according to the present practical example, the plurality of electronic components may further include a third electronic component that is disposed at the major surface 90*a* and that includes the transmit filter 63T coupled to the output end of the power amplifier 12; and at least a portion of the second electronic component may overlap at least a portion of the third electronic component in plan view of the module substrate 90.

This configuration enhances the flexibility in positioning the transmit filter 63T, which is disposed at the major surface 90*a*. With this configuration, the isolation between transmission and reception can be easily improved by increasing the distance from the transmit filter 63T to the receive components.

In an example, the radio-frequency module 1A according to the present practical example may further include the ground electrode layers GP inside the module substrate 90; and at least a portion of the second electronic component may overlap at least a portion of the ground electrode layers GP in plan view of the module substrate 90.

This configuration improves isolation between the radio-frequency components disposed at the major surface 90*a* and the bypass capacitor (the capacitor 73 or 74).

In an example, in the radio-frequency module 1A according to the present practical example, the second electronic component may be a semiconductor component.

With this configuration, the height of the second electronic component disposed at the major surface 90*b* can be lowered, and the height of the radio-frequency module 1A can be accordingly reduced. In particular, assuming the second electronic component is formed by a silicon capacitor, the second electronic component can be thinned through backgrinding. As a result, the height of the radio-frequency module 1A can be further reduced.

The radio-frequency module 1A according to the present practical example includes the module substrate 90 having the major surfaces 90*a* and 90*b* that are opposite to each other, a plurality of electronic components disposed at the major surface 90*a* and at the major surface 90*b*, and the post electrodes 150 that are disposed at the major surface 90*b* and that include the power supply terminal 133 or 134. The plurality of electronic components includes a first electronic component (for example, the integrated circuit 20 or 80) that is disposed at the major surface 90*b* and that includes an active circuit (for example, the low-noise amplifiers 21 to 23 or the control circuit 81) coupled to the power supply terminal 133 or 134 and a second electronic component that is disposed at the major surface 90*b* and that includes the capacitor 73 or 74 coupled between the path connecting the power supply terminal 133 or 134 to the active circuit and ground. The second electronic component is disposed between the power supply terminal 133 or 134 and the first electronic component in plan view of the module substrate 90.

As described above, the second electronic component including the capacitor 73 or 74, which is coupled between the path connecting the power supply terminal to the active circuit and ground, is disposed together with the power supply terminal 133 or 134 at the same major surface 90*b*. The second electronic component is disposed between the first electronic component and the power supply terminal 133 or 134. Positioning the second electronic in this manner shortens the wire 731 or 734 that connects the power supply terminal 133 or 134 to the bypass capacitor (the capacitor 73 or 74) and the wire 732 or 742 that connects the integrated circuit 20 or 80 to the bypass capacitor. As a result, this configuration mitigates interference from noise on the wire 731 or 741. Further, shortening the wire 732 or 742 reduces the impedance of the wire 732 or 742. This configuration thus suppresses degradation of the characteristics of the bypass capacitor that can occur due to the impedance of the wire 732 or 742.

2.2 Second Practical Example

Next, as a second practical example of the radio-frequency circuit 1 according to the embodiment described above, a radio-frequency module 1B including the radio-frequency circuit 1 will be described. This practical example primarily differs from the first practical example in the combination and layout of the first electronic component and the second electronic component. In the following, the radio-frequency module 1B according to the present practical example will be described with reference to FIGS. 6 and 7, focusing primarily on features that differ from the first practical example.

2.2.1 Component Layout of Radio-Frequency Module 1B

Figure 6:
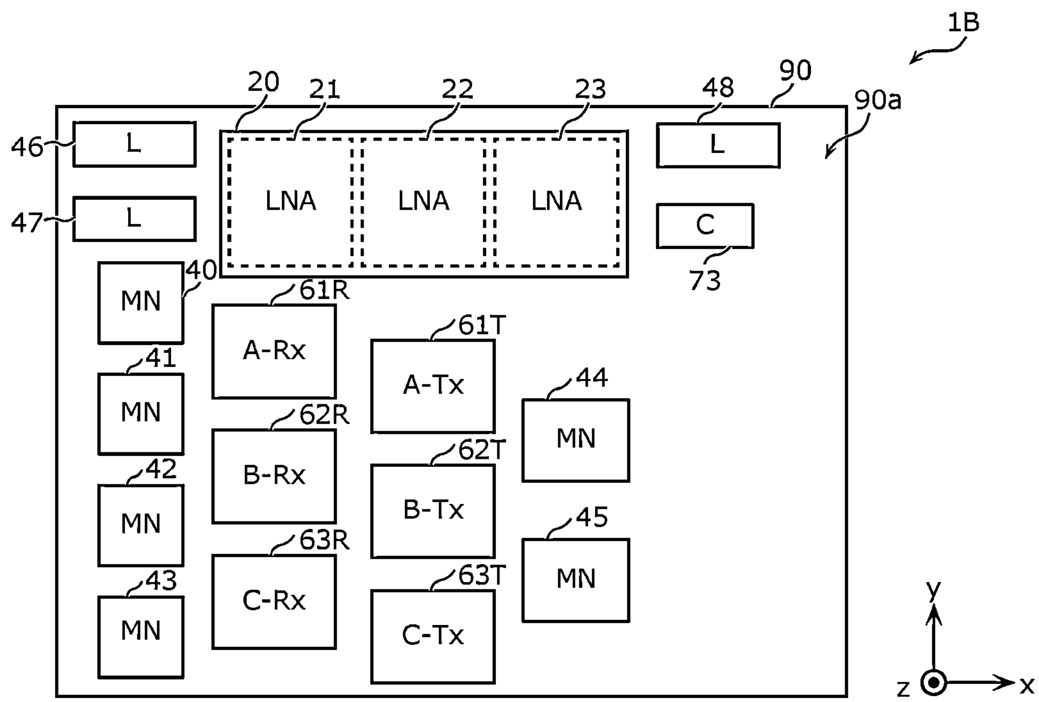
FIG. 6 is a plan view of a radio-frequency module according to a second practical example.
Figure 7:
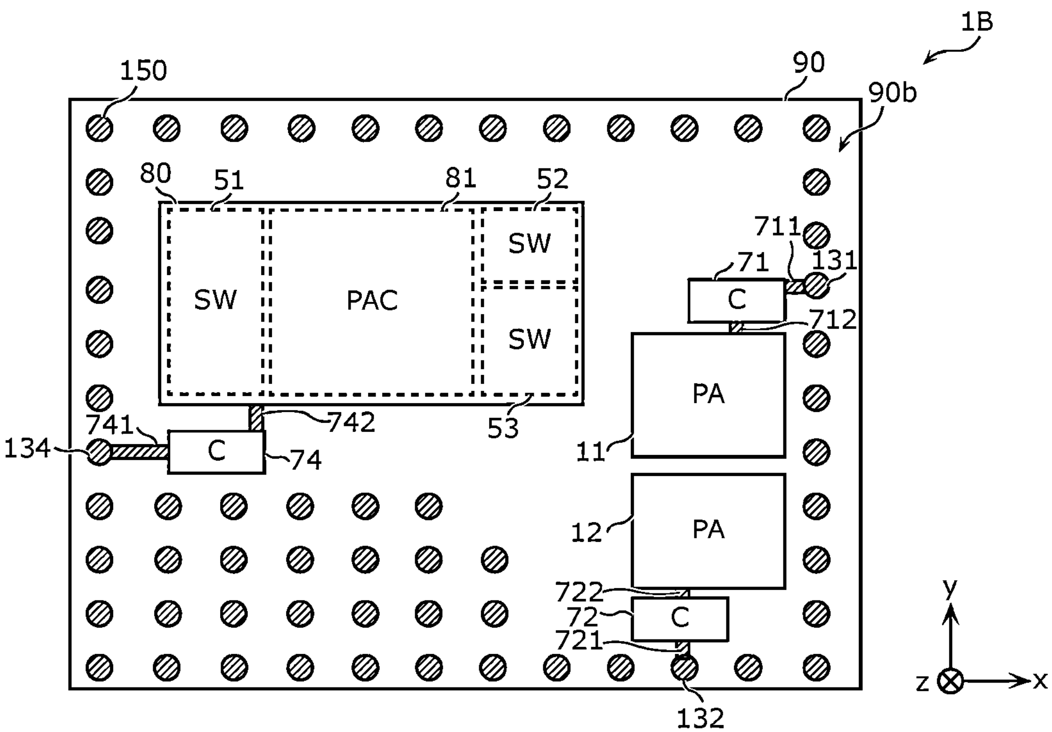
FIG. 7 is a plan view of the radio-frequency module according to the second practical example.

FIG. 6 is a plan view of the radio-frequency module 1B according to the present practical example. FIG. 7 is a plan view of the radio-frequency module 1B according to the present practical example assuming a major surface 90*b* of a module substrate 90 is viewed through the module substrate 90 from the positive side of the z-axis. Similarly to FIGS. 2 and 3, resin members 91 and 92 and a shield electrode layer 93 are not illustrated in FIGS. 6 and 7.

At the major surface 90*a*, as illustrated in FIG. 6, an integrated circuit 20 including the low-noise amplifiers 21 to 23, and the capacitor 73 are disposed in place of the power amplifiers 11 and 12 and the capacitors 71 and 72.

At the major surface 90*b*, as illustrated in FIG. 7, the power amplifiers 11 and 12, the integrated circuit 80 including the switches 51 to 53 and the control circuit 81, the capacitors 71, 72, and 74, the resin member 92 (not illustrated), and multiple post electrodes 150 are disposed.

In the present practical example, each of the power amplifiers 11 and 12 and the integrated circuit 80 is an example of a first electronic component. Each of the capacitors 71, 72, and 74 is an example of a second electronic component.

Each of the two electronic components (hereinafter simply referred to as the capacitors 71 and 72) that respectively include the capacitors 71 and 72 is a semiconductor component. In the present practical example, the capacitors 71 and 72 are silicon capacitors that are constructed using silicon substrates (silicon wafers) through a semiconductor process. The capacitors 71 and 72 are not limited to silicon capacitors and are not necessarily semiconductor components. The capacitors 71 and 72 may be included in IPDs using silicon substrates.

The capacitor 71 is coupled to a post electrode 150 that serves as the power supply terminal 131 via a wire 711, and to the power amplifier 11 via a wire 712. At least a portion of the capacitor 71 overlaps at least a portion of the ground electrode layers GP in plan view of the module substrate 90.

The capacitor 71 is disposed adjacent to the power supply terminal 131. Specifically, (e) the power supply terminal 131 is disposed closer to the capacitor 71 than any of the other post electrodes 150; and (f) the capacitor 71 is disposed closer to the power supply terminal 131 than any of the other electronic components (in this example, the power amplifiers 11 and 12, the integrated circuit 80, and the capacitors 72 and 74) disposed at the major surface 90*b*. In other words, the distance between the capacitor 71 and the power supply terminal 131 is (e) less than or equal to the distance between the capacitor 71 and each of the other post electrodes 150 and (f) less than or equal to the distance between the power supply terminal 131 and each of the other electronic components. It is more effective assuming the distance between the capacitor 71 and the power supply terminal 131 is less than or equal to the thickness of the module substrate 90.

The capacitor 72 is coupled to a post electrode 150 that serves as the power supply terminal 132 via a wire 721, and to the power amplifier 12 via a wire 722. At least a portion of the capacitor 72 overlaps at least a portion of the ground electrode layers GP in plan view of the module substrate 90.

The capacitor 72 is disposed adjacent to the power supply terminal 132. Specifically, (g) the power supply terminal 132 is disposed closer to the capacitor 72 than any of the other post electrodes 150 disposed at the major surface 90*b*; and (h) the capacitor 72 is disposed closer to the power supply terminal 132 than any of the other electronic components (in this example, the power amplifiers 11 and 12, the integrated circuit 80, and the capacitors 71 and 74) disposed at the major surface 90*b*. In other words, the distance between the capacitor 72 and the power supply terminal 132 is (g) less than or equal to the distance between the capacitor 72 and each of the other post electrodes 150 and (h) less than or equal to the distance between the power supply terminal 132 and each of the other electronic components. It is more effective assuming the distance between the capacitor 72 and the power supply terminal 132 is less than or equal to the thickness of the module substrate 90.

The capacitor 74 is coupled to a post electrode 150 that serves as the power supply terminal 134 via a wire 741, and to the integrated circuit 80 via a wire 742. At least a portion of the capacitor 74 overlaps at least a portion of the ground electrode layers GP in plan view of the module substrate 90.

The capacitor 74 is disposed adjacent to the power supply terminal 134. Specifically, (i) the power supply terminal 134 is disposed closer to the capacitor 74 than any of the other post electrodes 150; and (j) the capacitor 74 is disposed closer to the power supply terminal 134 than any of the other electronic components (in this example, the integrated circuits 20 and 80 and the capacitor 73) disposed at the major surface 90*b*. In other words, the distance between the capacitor 74 and the power supply terminal 134 is (i) less than or equal to the distance between the capacitor 74 and each of the other post electrodes 150 and (j) less than or equal to the distance between the power supply terminal 134 and each of the other electronic components. It is more effective assuming the distance between the capacitor 74 and the power supply terminal 134 is less than or equal to the thickness of the module substrate 90.

The layout of the electronic components in the present practical example is illustrative, and the present practical example is not to be interpreted as limiting. For example, although in the present practical example, the layout of the capacitor 71 and the power supply terminal 131 satisfies both (e) and (f) described above, this is not to be interpreted as limiting. For example, only one of (e) and (f) may be satisfied. Similarly, although the layout of the capacitor 72 and the power supply terminal 132 satisfies both (g) and (h) described above, this is not to be interpreted as limiting. For example, only one of (g) and (h) may be satisfied. Similarly, although the layout of the capacitor 74 and the power supply terminal 134 satisfies both (i) and (j) described above, this is not to be interpreted as limiting. For example, only one of (i) and (j) may be satisfied.

2.2.2 Effects of Radio-Frequency Module 1B

As described above, the radio-frequency module 1B according to the present practical example includes the module substrate 90 having the major surfaces 90*a* and 90*b* that are opposite to each other, a plurality of electronic components disposed at the major surface 90*a* and at the major surface 90*b*, and the post electrodes 150 that are disposed at the major surface 90*b* and that include the power supply terminal 131, 132, or 134. The plurality of electronic components includes a first electronic component that is disposed at the major surface 90*b* and that includes an active circuit (for example, the power amplifier 11 or 12 or the control circuit 81) coupled to the power supply terminal 131, 132, or 134 and a second electronic component that is disposed at the major surface 90*b* and that includes the capacitor 71, 72, or 74 coupled between the path connecting the power supply terminal 131, 132, or 134 to the active circuit and ground. The power supply terminal 131, 132, or 134 is disposed closer to the second electronic component than any of the other post electrodes; and/or the second electronic component is disposed closer to the power supply terminal 131, 132, or 134 than any other electronic component disposed at the major surface 90*b*.

As described above, the second electronic component including the capacitor 71, 72, or 74, which is coupled between the path connecting the power supply terminal to the active circuit and ground, is disposed close to the power supply terminal 131, 132, or 134 at the same major surface 90*b*. Positioning the second electronic component in this manner shortens the wire 731 or 741 that connects the bypass capacitor (the capacitor 73 or 74) to the power supply terminal 133 or 134, thereby mitigating interference from noise on the wire 731 or 741. As a result, this configuration enhances noise reduction.

In an example, in the radio-frequency module 1B according to the present practical example, the active circuit included in the first electronic component may be the control circuit 81 configured to control the power amplifiers 11 and 12.

This configuration enhances noise reduction on the control circuit 81.

In an example, in the radio-frequency module 1B according to the present practical example, the active circuit included in the first electronic component may be the power amplifier 11 or 12.

This configuration enhances noise reduction on the power amplifier 11 or 12.

In an example, the radio-frequency module 1B according to the present practical example may further include the ground electrode layers GP inside the module substrate 90; and at least a portion of the second electronic component may overlap at least a portion of the ground electrode layers GP in plan view of the module substrate 90.

This configuration improves isolation between the radio-frequency components disposed at the major surface 90*a* and the bypass capacitor (the capacitor 73 or 74).

In an example, in the radio-frequency module 1B according to the present practical example, the second electronic component may be a semiconductor component.

With this configuration, the height of the second electronic component disposed at the major surface 90*b* can be lowered, and the height of the radio-frequency module 1B can be accordingly reduced. In particular, assuming the second electronic component is formed by a silicon capacitor, the second electronic component can be thinned through backgrinding. As a result, the height of the radio-frequency module 1B can be further reduced.

Modifications

The radio-frequency module and the communication device according to the present disclosure have been described above based on the embodiment and practical examples. However, the radio-frequency module and the communication device are not limited to the embodiment and practical examples. The present disclosure also embraces other practical examples implemented by any combination of the constituent elements of the practical examples, other modifications obtained by making various modifications that occur to those skilled in the art without departing from the scope of the embodiment and practical examples, and various hardware devices including the radio-frequency module.

For example, in the circuit configuration of the radio-frequency circuit and the communication device according to the embodiment described above, other circuit elements and/or interconnections may also be inserted in the paths connecting the circuit elements and the signal paths that are illustrated in the drawings. For example, matching circuits may be inserted between the switch 52 and the transmit filter 61T and/or between the switch 53 and the transmit filter 62T and/or the transmit filter 63T.

In the embodiment, the bands A to C represent bands for FDD, but the bands A to C may be bands for time division duplex (TDD). In this case, the transmit filter and the receive filter may be formed as a single filter.

In the embodiment, the radio-frequency circuit 1 includes three low-noise amplifiers 21 to 23, but the number of low-noise amplifiers is not limited to three. For example, assuming the number of low-noise amplifiers is one, the radio-frequency circuit 1 may include a switch that is coupled between the low-noise amplifier and the receive filters 61R to 63R. In this case, the switch may be included in the integrated circuit 20.

INDUSTRIAL APPLICABILITY

The present disclosure can be used as a radio-frequency module provided at the front-end in a wide variety of communication devices such as mobile phones.

REFERENCE SIGNS LIST

1 radio-frequency circuit
1A, 1B radio-frequency module
2 antenna
3 RFIC
4 BBIC
5 power supply circuit
6 communication device
11, 12 power amplifier
20, 80 integrated circuit
21, 22, 23 low-noise amplifier
40, 41, 42, 43, 44, 45 matching circuit
46, 47, 48 inductor
51, 52, 53 switch
61, 62, 63 duplexer
61R, 62R, 63R receive filter
61T, 62T, 63T transmit filter
71, 72, 73, 74 capacitor
81 control circuit
90 module substrate
90*a*, 90*b* major surface
91, 92 resin member
93 shield electrode layer
100 antenna connection terminal
111, 112 radio-frequency input terminal
121, 122, 123 radio-frequency output terminal
131, 132, 133, 134 power supply terminal
141 control terminal
150 post electrode
511, 512, 513, 514, 521, 522, 531, 532, 533 terminal
711, 712, 721, 722, 731, 732, 741, 742 wire
GP ground electrode layer

The invention claimed is:

1. A radio-frequency module comprising:
a module substrate having a first major surface and a second major surface that are opposite to each other;
a plurality of electronic components disposed at the first major surface and at the second major surface; and
a plurality of external connection terminals disposed at the second major surface, the plurality of external connection terminals including a power supply terminal, wherein
the plurality of electronic components includes
a first electronic component disposed at the second major surface, the first electronic component including an active circuit coupled to the power supply terminal, and
a second electronic component disposed at the second major surface, the second electronic component including a capacitor coupled between a path connecting the power supply terminal to the active circuit and ground,
the power supply terminal is disposed closer to the second electronic component than any other external connection terminals, and
a ground electrode layer within the module substrate, wherein
at least a portion of the second electronic component overlaps at least a portion of the ground electrode layer in plan view of the module substrate.

2. The radio-frequency module according to claim 1, wherein
the second electronic component is disposed closer to the power supply terminal than any other electronic component disposed at the second major surface.

3. The radio-frequency module according to claim 2, wherein
the second electronic component is disposed between the first electronic component and the power supply terminal in plan view of the module substrate.

4. The radio-frequency module according to claim 3, wherein
the active circuit is a low-noise amplifier.

5. The radio-frequency module according to claim 4, wherein
the plurality of electronic components further includes
a third electronic component disposed at the first major surface, the third electronic component including an inductor coupled to an input end of the low-noise amplifier, and
at least a portion of the second electronic component overlaps at least a portion of the third electronic component in plan view of the module substrate.

6. The radio-frequency module according to claim 3, wherein
the active circuit is a control circuit configured to control a power amplifier.

7. The radio-frequency module according to claim 6, wherein
the plurality of electronic components further includes
a third electronic component disposed at the first major surface, the third electronic component including a filter coupled to an output end of the power amplifier, and at least a portion of the second electronic component overlaps at least a portion of the third electronic component in plan view of the module substrate.

8. The radio-frequency module according to claim 3, wherein the active circuit is a power amplifier.

9. The radio-frequency module according to claim 1, wherein the second electronic component is a semiconductor component.

10. A radio-frequency module comprising:

a module substrate having a first major surface and a second major surface that are opposite to each other;

a plurality of electronic components disposed at the first major surface and at the second major surface; and a plurality of external connection terminals disposed at the second major surface, the plurality of external connection terminals including a power supply terminal, wherein the plurality of electronic components includes a first electronic component disposed at the second major surface, the first electronic component including an active circuit coupled to the power supply terminal, and a second electronic component disposed at the second major surface, the second electronic component including a capacitor coupled between a path connecting the power supply terminal to the active circuit and ground, and a ground electrode layer within the module substrate, wherein at least a portion of the second electronic component overlaps at least a portion of the ground electrode layer in plan view of the module substrate, and the second electronic component is disposed closer to the power supply terminal than any other electronic component disposed at the second major surface.

11. The radio-frequency module according to claim 10, wherein the second electronic component is disposed between the first electronic component and the power supply terminal in plan view of the module substrate.

12. The radio-frequency module according to claim 11, wherein the active circuit is a low-noise amplifier.

13. The radio-frequency module according to claim 12, wherein the plurality of electronic components further includes a third electronic component disposed at the first major surface, the third electronic component including an inductor coupled to an input end of the low-noise amplifier, and at least a portion of the second electronic component overlaps at least a portion of the third electronic component in plan view of the module substrate.

14. The radio-frequency module according to claim 11, wherein the active circuit is a control circuit configured to control a power amplifier.

15. The radio-frequency module according to claim 14, wherein the plurality of electronic components further includes a third electronic component disposed at the first major surface, the third electronic component including a filter coupled to an output end of the power amplifier, and at least a portion of the second electronic component overlaps at least a portion of the third electronic component in plan view of the module substrate.

16. The radio-frequency module according to claim 11, wherein the active circuit is a power amplifier.

17. The radio-frequency module according to claim 10, wherein the second electronic component is a semiconductor component.

18. A radio-frequency module comprising:

a module substrate having a first major surface and a second major surface that are opposite to each other;

a plurality of electronic components disposed at the first major surface and at the second major surface; and a plurality of external connection terminals disposed at the second major surface, the plurality of external connection terminals including a power supply terminal, wherein the plurality of electronic components includes a first electronic component disposed at the second major surface, the first electronic component including an active circuit coupled to the power supply terminal, and a second electronic component disposed at the second major surface, the second electronic component including a capacitor coupled between a path connecting the power supply terminal to the active circuit and ground, and a ground electrode layer within the module substrate, wherein at least a portion of the second electronic component overlaps at least a portion of the ground electrode layer in plan view of the module substrate, and the second electronic component is disposed between the power supply terminal and the first electronic component in plan view of the module substrate.

* * * * *